United States Patent Office 3,383,436
Patented May 14, 1968

3,383,436
NEO CARBOXYLATE DIPHOSPHITES
Millard S. Larrison, Livingston, N.J., assignor to Weston Chemical Corporation, Newark, N.J., a corporation of New Jersey
No Drawing. Continuation-in-part of application Ser. No. 376,202, June 18, 1964. This application July 13, 1965, Ser. No. 471,711
13 Claims. (Cl. 260—928)

This application is a continuation-in-part of application Ser. No. 376,202, filed June 18, 1964.

This invention relates to the preparation of phosphite esters.

It is an object of the present invention to prepare novel phosphite esters.

Another object is to prepare phosphite esters having unusually good thermal stability.

A further object is to prepare phosphite esters having excellent hydrolytic stability.

An additional object is to impart improved stability to polymers.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having the formula

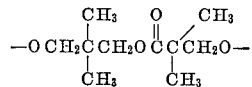

I where $R_1$, $R_2$, $R_3$ and $R_4$ are alkyl, aryl or haloaryl.

As used in the present specification and claims, aryl is synonymous with carbocyclic aryl.

The compounds are conveniently prepared by reacting, 2,2 - dimethyl - 3-hydroxypropyl 2,2-dimethyl-3-hydroxypropionate (also called Ester diol 204) with a trialkyl phosphite, a triaryl phosphite, a trihaloaryl phosphite, an aryldialkyl phosphite or a diarylalkyl phosphite or a mixture of such phosphites in the presence of a catalyst. Sometimes it is more convenient to use a mixture of a triaryl phosphite of a low-boiling phenol with either a high-boiling phenol or high-boiling alcohol to form the phosphite of the high-boiling phenol or alcohol.

As the starting phosphite there can be used alkyl, aryl and haloaryl phosphites such as trimethyl phosphite, triethyl phosphite, tripropyl phosphite, triamyl phosphite, tris octyl phosphite, tris isooctyl phosphite, tris decyl phosphite, tris isodecyl phosphite, tris octadecyl phosphite, tris dodecyl phosphite, triphenyl phosphite, tri-o-cresyl phosphite, tri-p-cresyl phosphite, tri-m-cresyl phosphite, tri-xylenyl phosphite, tri ethylphenyl phosphite, tri butylphenyl phosphite, tri - p - chlorophenyl phosphite, tri-o-chlorophenyl phosphite, tri 2,4-dichlorophenyl phosphite, tri 2,4,5-trichlorophenyl phosphite, tri 2,4,6-trichlorophenyl phosphite, tri-p-bromophenyl phosphite, tri pentachlorophenyl phosphite, phenyl diisodecyl phosphite, diphenyl decyl phosphite, tri α-naphthyl phosphite, o-cresyl dioctadecyl phosphite, m-cresyl dioctyl phosphite, di-p-cresyl hexyl phosphite, tri dodecylphenyl phosphite.

As the high boiling alcohol or phenol which can be used with a triaryl phosphite of a relatively low boiling phenol there can be used octylphenol, nonylphenol, t-octyl phenol, dodecylphenol, pentachlorophenol, pentabromophenol, butyl phenol, decyl alcohol, isodecyl alcohol, dodecyl alcohol, octyl alcohol, octadecyl alcohol, eicosanyl alcohol.

As the catalyst there can be used a dihydrocarbon phosphite or an alkaline catalyst in an amount of 0.05–5% by weight of the trihydrocarbyl or trihaloaryl phosphite reactant. Thus, as catalysts there can be used dialkyl or diaryl phosphites such as diphenyl phosphite, di-o-cresyl phosphite, di-p-cresyl phosphite, didecyl phosphite, diisodecyl phosphite, dioctadecyl phosphite, dimethyl phosphite, diethyl phosphite or dihalohydrocarbyl phosphites such as di-o-chlorophenyl phosphite, di-2,4-dichlorophenyl phosphite or alkaline catalysts such as sodium phenolate, sodium methylate, sodium cresylate, potassium phenolate, sodium isodecylate. The alkaline catalysts preferably have a pH of at least 11 in an 0.1 N solution.

The compound of the present invention within Formula I can be conveniently called tetrahydrocarbyl neo carboxylate diphosphites and tetrahaloaryl neo carboxylate diphosphites wherein the term neo carboxylate signifies the grouping

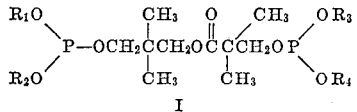

Thus, there are included in the present invention tetraphenyl neo carboxylate diphosphite, tetrakis nonylphenyl neo carboxylate diphosphite, tetra isodecyl neo carboxylate diphosphite, tetrakis t-octylphenyl neo carboxylate diphosphite, diphenyl diisodecyl neo carboxylate diphosphite, triphenyl isodecyl neo carboxylate diphosphite, phenyl tris isodecyl neo carboxylate diphosphite, tetramethyl neo carboxylate diphosphite, tetra decyl neo carboxylate diphosphite, tetra octadecyl neo carboxylate diphosphite, tetra p-cresyl neo carboxylate diphosphite, tetrakis pentachlorophenyl neo carboxylate diphosphite, tetrakis pentabromophenyl neo carboxylate diphosphite, tetrakis 2,4,5-trichlorophenyl neo carboxylate diphosphite, tetrakis 2,4,6-trichlorophenyl neo carboxylate diphosphite, tetra p-chlorophenyl neo carboxylate diphosphite, tetra o-bromophenyl neo carboxylate diphosphite, tetra α-naphthyl neo carboxylate diphosphite, di p-cresyl dioctyl neo carboxylate diphosphite, tri dodecyl pentabromophenyl neo carboxylate diphosphite, tetrakis dodecylphenyl neo carboxylate diphosphite, tetra isooctyl neo carboxylate diphosphite, tetra dodecyl neo carboxylate diphosphite, tetrakis sec butylphenyl neo carboxylate diphosphite, diphenyl di 2,4,5-trichlorophenyl neo carboxylate diphosphite.

The compounds of the present invention are useful in imparting stability to polyvinyl chloride and other vinyl chloride polymers, e.g., vinyl chloride-vinylidene chloride copolymer (80:20), vinyl chloride-vinyl acetate (87:13). They also are stabilizers for monoolefin polymers such as polyethylene, polypropylene, ethylene-propylene copolymers (e.g., 50:50, 80:20 and 20:80), ethylene-monoolefin copolymers wherein the monoolefin has 4–10 carbon atoms and is present in a minor amount, e.g. ethylene-butene-1 copolymer and ethylene decene-1 copolymer. Furthermore, they can be used to stabilize natural rubber, styrene-butadiene rubber (SBR rubber), ethylene-propylene-nonconjugated diene terpolymers, e.g., ethylene-propylene-dicyclopentadiene, polybutadiene, poly cis isoprene. Also, they are stabilizers for polyesters, e.g. styrene modified diethylene glycol adipate-maleate.

The compounds of the present invention are normally employed in an amount of 0.25 to 10% by weight of the polymer they are intended to stabilize. They are particularly good as thermal stabilizers.

Unless otherwise indicated, all parts and percentages are by weight.

Example 1

Triphenyl phosphite (2480 grams, 8 moles), Ester diol 204 (816 grams, 4 moles), and diphenyl phosphite (15 grams) as a catalyst were heated at 120–150° C. at 15 mm. Hg pressure. The phenol formed in the reaction was removed by distillation. A total of 758 grams of distillate, mainly phenol, was obtained. The reaction was completed by heating at 150° C. at 1–2 mm. pressure. The residue in the pot was treated with 7 grams of soda ash, 10 grams of Attagel (attapulgus clay) and 10 grams of Hi-Flow (filter aid) and filtered hot to yield tetraphenyl neo carboxylate diphosphite having the formula

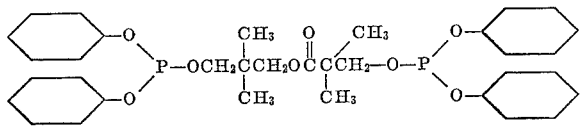

as a colorless liquid $n_D^{25}$ 1.5506 in a yield of 2550 grams.

Example 2

Triphenyl phosphite (1240 grams, 4 moles), nonylphenol (1760 grams, 8 moles), Ester diol 204 (408 grams, 2 moles) and diphenyl phosphite (20 grams) were heated as in Example 1 to give 1072 grams of phenol as a distillate and tetrakis nonylphenyl neo carboxylate diphosphite as the liquid residue in the pot and having an $n_D^{25}$ 1.5209. This product was useful, e.g. in an amount of 1% as a stabilizer for natural rubber, cis isoprene rubber and SBR rubber.

Example 3

Triphenyl phosphite (1240 grams, 4 moles), isodecyl alcohol (1283 grams, 8 moles), Ester diol 204 (408 grams, 2 moles) and diphenyl phosphite (15 grams) were heated as in Example 1 to give 1072 grams of phenol as a dastillate and tetra isodecyl neo carboxylate diphosphite as the liquid residue in the pot having an $n_D^{25}$ 1.4666.

Example 4

The same product as that of Example 3 was prepared by using 2 moles of phenyl di isodecyl phosphite, 1 mole of Ester diol 204 and 10 grams of diphenyl phosphite and heating as in Example 1 until 188 grams of phenol were removed as a distillate.

Example 5

By varying the amount of isodecyl alcohol from 0 to 2 moles per mole of triphenyl phosphite, an infinite number of diphosphite ester combinations can be prepared which vary in alkyl and aryl content between the extremes of Examples 1 and 3. Thus, when there was used a mixture of 1 mole of triphenyl phosphite, 1 mole of isodecyl alcohol and 0.5 mol of Ester diol 204 together with 5 grams of diphenyl phosphite catalyst in the process of Example 1, there was obtained a mixed alkyl aryl neo-carboxylate diphosphite averaging diphenyl diisodecyl neo carboxylate diphosphite as a liquid $n_D^{25}$ 1.5091. This product was a good stabilizer for polyvinyl chloride, e.g., when used in an amount of 1% of the polymer.

Example 6

Triphenyl phosphite (310 grams, 1 mole), Ester diol 204 (102 grams, 0.5 mole), t-octylphenol (512 grams, 2 moles) and diphenyl phosphite (5 grams) were heated together in the manner set forth in Example 1 and the phenol removed by distillation in vacuo as formed. A total of 268 grams of distillate was obtained. The liquid residue was filtered hot and on cooling solidified to give tetrakis t-octylphenyl neo carboxylate diphosphite as a brittle solid, softening point about 85° C. in a yield of 660 grams.

Example 7

Triphenyl phosphite (1 mole), Ester diol 204 (0.5 mole), pentachlorophenol (2 moles) and diphenyl phosphite (15 grams) were heated together in the manner set forth in Example 1 and the phenol removed by distillation in vacuo as formed to obtained tetrakis pentachlorophenyl neo carboxylate diphosphite as the residue in the pot.

What is claimed is:

1. 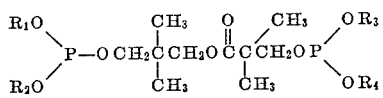

where $R_1$, $R_2$, $R_3$ and $R_4$ are selected from the group consisting of alkyl of 1 to 20 carbon atoms, phenyl, alkyl phenyl having 1 to 12 carbon atoms in the alkyl portion, naphthyl, chlorophenyl and bromophenyl.

2. A compound according to claim 1 wherein $R_1$, $R_2$, $R_3$ and $R_4$ are mono to pentachlorophenyl or mono to pentabromophenyl.

3. A compound according to claim 1 wherein $R_1$, $R_2$, $R_3$ and $R_4$ are selected from the group consisting of 1 to 20 carbon atom alkyl, phenyl, alkyl phenyl having up to 12 carbon atoms in the alkyl portion and naphthyl.

4. A compound according to claim 1 wherein $R_1$, $R_2$, $R_3$ and $R_4$ are alkyl.

5. A compound according to claim 1 wherein $R_1$, $R_2$, $R_3$ and $R_4$ are phenyl.

6. A compound according to claim 1 wherein $R_1$, $R_2$, $R_3$ and $R_4$ are alkyl phenyl.

7. A compound according to claim 6 wherein the alkyl group has 8 to 12 carbon atoms.

8. A compound according to claim 1 wherein $R_1$, $R_2$, $R_3$ and $R_4$ are alkyl groups having 8 to 18 carbon atoms.

9. A compound according to claim 1 wherein at least one of $R_1$, $R_2$, $R_3$ and $R_4$ is alkyl, at least one of $R_1$, $R_2$, $R_3$ and $R_4$ is phenyl or alkyl phenyl and the balance of $R_1$, $R_2$, $R_3$ and $R_4$ are selected from the group consisting of alkyl and phenyl or alkyl phenyl.

10. Tetra nonylphenyl neo carboxylate diphosphite.

11. Tetra isodecyl neo carboxylate diphosphite.

12. Tetrakis t-octylphenyl neo carboxylate diphosphite.

13. Diphenyl diisodecyl neo carboxylate diphosphite.

References Cited

UNITED STATES PATENTS 3,131,151   4/1964   Kershner et al. ___ 260—928 XR

CHARLES B. PARKER, *Primary Examiner.*

A. H. SUTTO, *Assistant Examiner.*